United States Patent
Jiang et al.

(10) Patent No.: US 11,009,764 B2
(45) Date of Patent: May 18, 2021

(54) HEAD MOUNTED DISPLAY INCLUDING VARIABLE BEAM DIVERGENCE AND/OR BEAM DIRECTION

(71) Applicant: Intel Corporation, Santa Clara, CA (US)

(72) Inventors: Jun Jiang, Portland, OR (US); Zhiming Zhuang, Sammamish, WA (US); Ginni Grover, Santa Clara, CA (US); Basel Salahieh, Santa Clara, CA (US); Oscar Nestares, San Jose, CA (US); David W. Browning, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 172 days.

(21) Appl. No.: 15/860,584

(22) Filed: Jan. 2, 2018

(65) Prior Publication Data

US 2019/0041719 A1 Feb. 7, 2019

(51) Int. Cl.
*G02F 1/29* (2006.01)
*G02B 27/01* (2006.01)

(52) U.S. Cl.
CPC ............. *G02F 1/29* (2013.01); *G02B 27/017* (2013.01); *G02B 27/0172* (2013.01); *G02F 1/292* (2013.01)

(58) Field of Classification Search
CPC .. G02B 27/01; G02B 27/017; G02B 27/0172; G02F 1/29; G02F 1/292

USPC .................................................. 359/298, 630
See application file for complete search history.

(56) References Cited

U.S. PATENT DOCUMENTS

| | | | |
|---|---|---|---|
| 7,486,341 B2 * | 2/2009 | Hong | G02B 27/0172 349/11 |
| 9,335,548 B1 * | 5/2016 | Cakmakci | G02B 27/0172 |
| 2016/0349509 A1 * | 12/2016 | Lanier | G02B 27/0172 |
| 2017/0316736 A1 * | 11/2017 | Hughes | H01L 25/048 |
| 2018/0045953 A1 * | 2/2018 | Fan | G02B 27/0012 |

OTHER PUBLICATIONS

StarVR; "Panoramic Virtual Reality Headset"; StarVR; (2017); 14 pages; [retrieved on Jan. 17, 2017]; Retrieved from <URL: http://www.starvr.com >.
Wearality; Wearality Sky: Limitless Virtual Reality (VR); Kickstarter; (2017); 16 pages; [retrieved on Jan. 6, 2017]; Retrieved from <URL: http://www.kickstarter.com/projects/wearality-sky-limitless-vr >.
Zemax; "OpticStudio Customers Homepage—Zemax"; Zemax; (2017); 4 pages; [retrieved on Jan. 29, 2017]; Retrieved from <URL: http://www.zemax.com/os/opticstudio >.

* cited by examiner

*Primary Examiner* — Zachary W Wilkes
(74) *Attorney, Agent, or Firm* — Hanley, Flight & Zimmerman, LLC

(57) ABSTRACT

Technology for improving performance of a personal display device by variably controlling the emission divergence and/or the emission direction of light from the pixels of the display as a function of the location of the pixel within a display.

29 Claims, 11 Drawing Sheets

HEAD MOUNTED DISPLAY INCLUDING VARIABLE BEAM DIVERGENCE AND/OR BEAM DIRECTION

BACKGROUND

A Head Mounted Display is a device, worn on the head, that includes one or more displays positioned in front of one or more eyes of a user. HMDs can be used in Virtual Reality (VR) or Augment Reality (AR) applications for gaming, manufacturing, engineering, medicine, aviation and the like. HMDs are typically constrained by cost, size, weight, power consumption, Field of View (FOV), resolution and other similar criteria. Accordingly, there is a continuing need for improved HMDs.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

DESCRIPTION OF EMBODIMENTS

Figure 1:
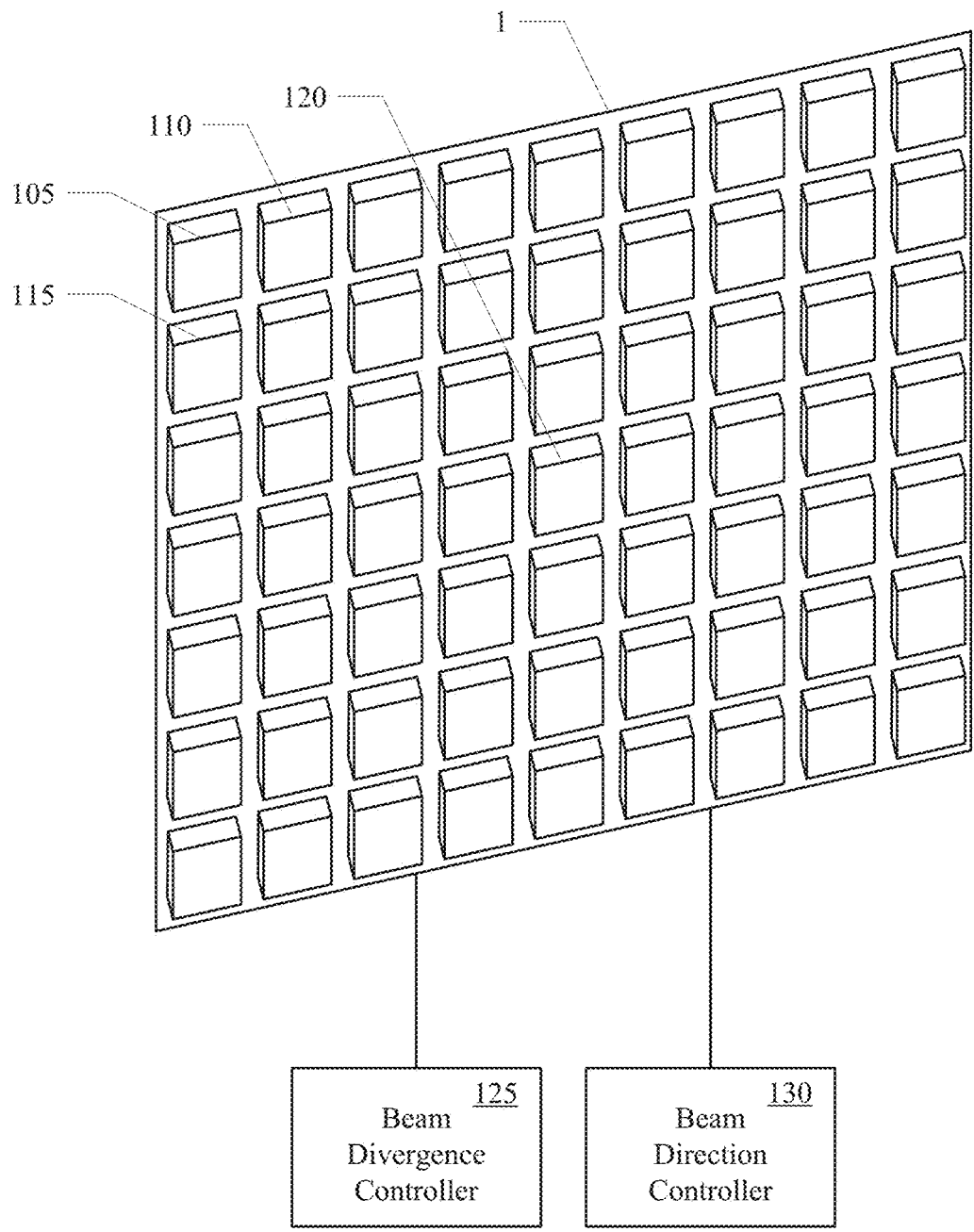
FIG. 1 is a diagram illustrating a personal display component in accordance with an example embodiment.

Before technology embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to convey a thorough understanding of various embodiments. One skilled in the relevant art will recognize, however, that such detailed embodiments do not limit the overall inventive concepts articulated herein, but are merely representative thereof.

As used in this written description, the singular forms "a," "an" and "the" include express support for plural referents unless the context clearly dictates otherwise. Thus, for example, reference to "a pixel" includes a plurality of such pixels.

Reference throughout this specification to "an example" means that a particular feature, structure, or characteristic described in connection with the example is included in one or more embodiments. Thus, appearances of the phrases "in an example" or "in an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples can be referred to herein along with alternatives for the various components thereof. It is understood that such embodiments, examples, and alternatives are not to be construed as de facto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open-ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," "maximized," "minimized," and the like refer to a property of a device, component, or activity that is measurably different from other devices, components, or activities in a surrounding or adjacent area, in a single device or in multiple comparable devices, in a group or class, in multiple groups or classes, or as compared to the known state of the art, or to a comparable device lacking identical features or components. For example, a data region that has an "increased" risk of corruption can refer to a region of a memory device, which is more likely to have write errors to it than other regions in the same memory device. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases, depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood, that such a range format is used merely for convenience and brevity, and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), an input device, and an output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high-level procedural or object-oriented programming language to communicate with a computer system. However, the program(s) may be implemented in assembly or machine language, if desired. In any case, the language may be a compiled or interpreted language, and combined with hardware implementations.

As used herein, the term "processor" can include general purpose processors, specialized processors such as central processing units (CPUs), graphics processing units (GPUs), digital signal processors (DSPs), microcontrollers (MCUs), embedded controller (ECs), field programmable gate arrays (FPGAs), or other types of specialized processors, as well as base band processors used in transceivers to send, receive, and process wireless communications.

It should be understood that many of the functional units described in this specification may have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in one or more embodiments of the present technology. Thus, appearances of the phrases "in an example" or "in an embodiment" or the word "exemplary" in various places throughout this specification are not necessarily all referring to the same embodiment.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one aspect, a personal display device can be configured to control the beam divergence and/or the beam direction of light from the pixels of the display device based on the location of the pixels within the display device. Therefore, pixels at different locations can have different emission profiles. For example, pixels further away from the center of the display have a different emission profile than those at the center of the display to direct more light through one or more lenses to the eyes of a user. The personal display device can be utilized in a Head Mounted Display (HMD) of a device. Controlling the beam divergence and/or beam angle based on the location of the pixels within the display device can be utilized to reduce the size and weight of the display device for use in the HMD. Controlling the beam divergence and/or beam angle based on the location of the pixels within the display device can also be utilized to improve the Field of View (FOV) and/or resolution for a given display size. Controlling the beam divergence and/or beam angle based on the location of the pixels within the display device can also increase the transmission of light to the user's eyes. In such case, the intensity of the light can be reduced, which can reduce power consumption by the display device.

FIG. 1 is a diagram illustrating a personal display component in accordance with an example. The personal display component can include an array of light sources 105-120, and one or more beam controllers 125, 130. In one implementation, the array of light sources 105-120 can be arranged in a flat plane, as illustrated in FIG. 1. In another implementation, the array of light sources 105-120 can be arranged in a curve along one or more axes of the array.

Figure 2:
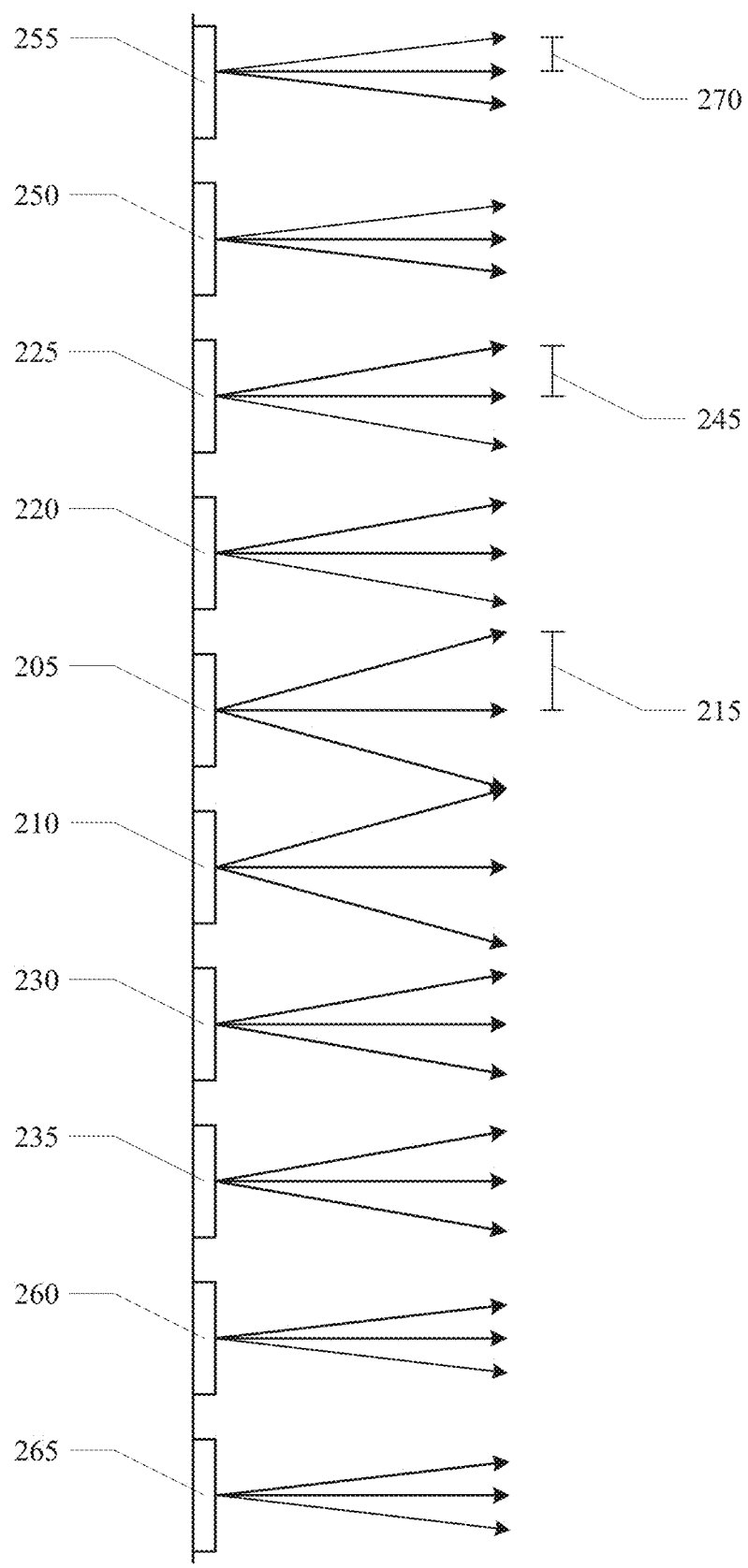
FIG. 2 is a diagram illustrating adjusting a beam divergence as a function of a plurality of regions of a planar display in accordance with an example embodiment.

In one embodiment, the personal display component can include an array of light sources 105-120, and a beam divergence controller 125. The beam divergence controller 125 can be configured to vary a beam divergence of the light sources 105-120 as a function of a plurality of regions of the array of light sources 105-120. For example, as illustrated in FIG. 2, the beam divergence controller 125 can configure a subset of pixels 205, 210 at the center of the array to have a first Full-Width Half Maximum (FWHM) value 215, a second subset of pixels 220-235 on either side of the center pixels 205, 210 to have a second FWHM value 240 that is less than the first FWHM value 215, and a third subset of pixels 250-265 out at either end to have a third FWHM value 270 that is less than the second FWHM value 245. In one implementation, the variance of the beam divergence can be determined during a design phase of a given optical design, and the beam divergence controller 125 can fixedly apply the designed variance for the given optical design.

Figure 3:
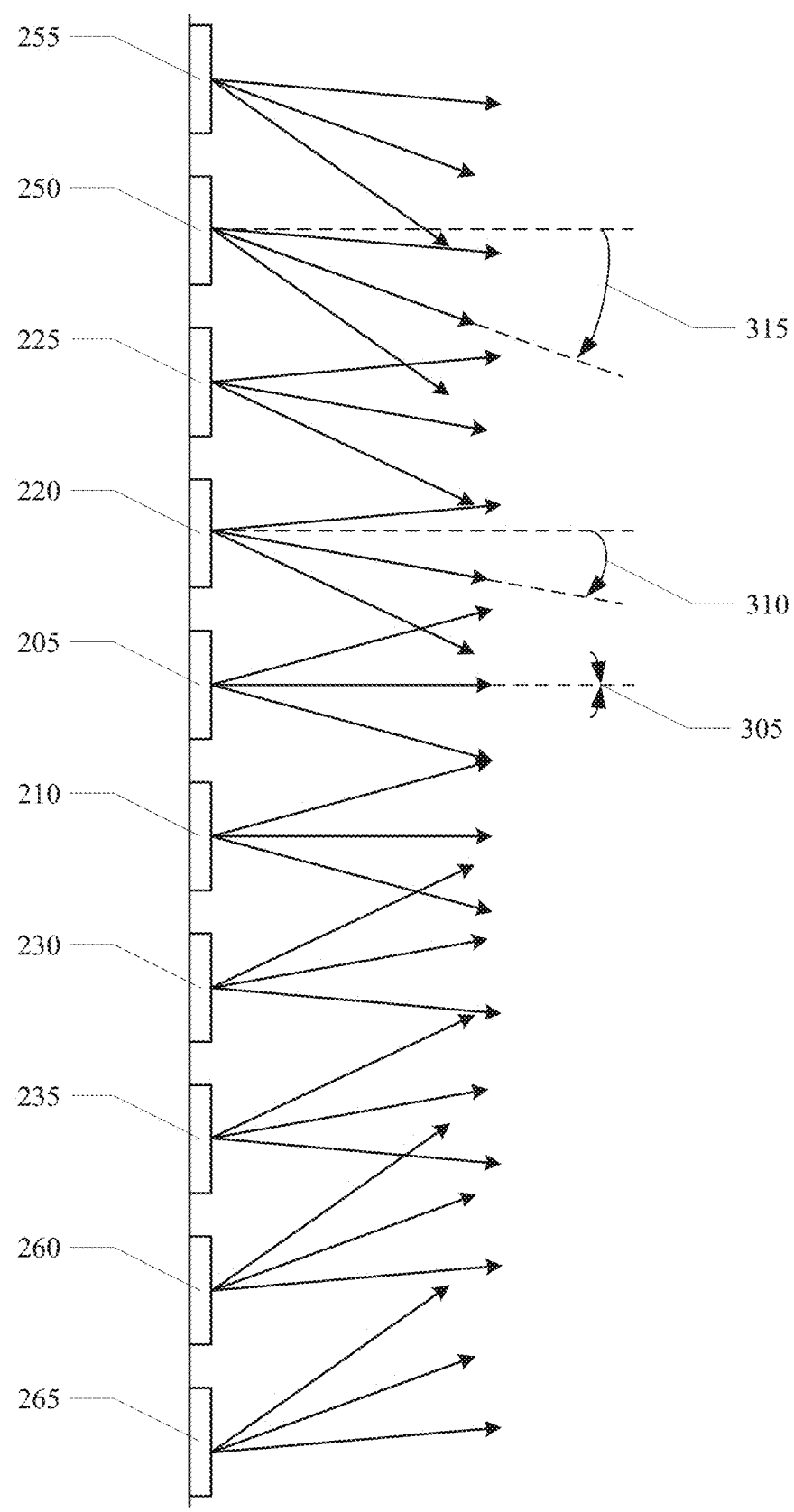
FIG. 3 is a diagram illustrating adjusting a beam direction as a function of a plurality of regions of a planar display in accordance with an example embodiment.

In another embodiment, the personal display component can include an array of light sources 105-120, and a beam direction controller 130. The beam direction controller 130 can be configured to vary a beam direction of the light sources 105-120 as a function of the plurality of regions of the array of light sources 105-120. For example, as illustrated in FIG. 3, the beam direction controller 130 can configure a subset of pixels 205, 210 at the center of the array to have a first beam angle 305, a second subset of pixels 220-235 on either side of the center pixels 205, 210 to have a second beam angle 310 that is less than the first beam angle 305, and a third subset of pixels 250-265 out at either end to have a third beam angle 315 that is less than the second beam angle 310. In one implementation, the variance of the beam direction can be determined during a design phase of a given optical design, and the beam direction controller 125 can fixedly apply the designed variance for the given optical design.

Figure 4:
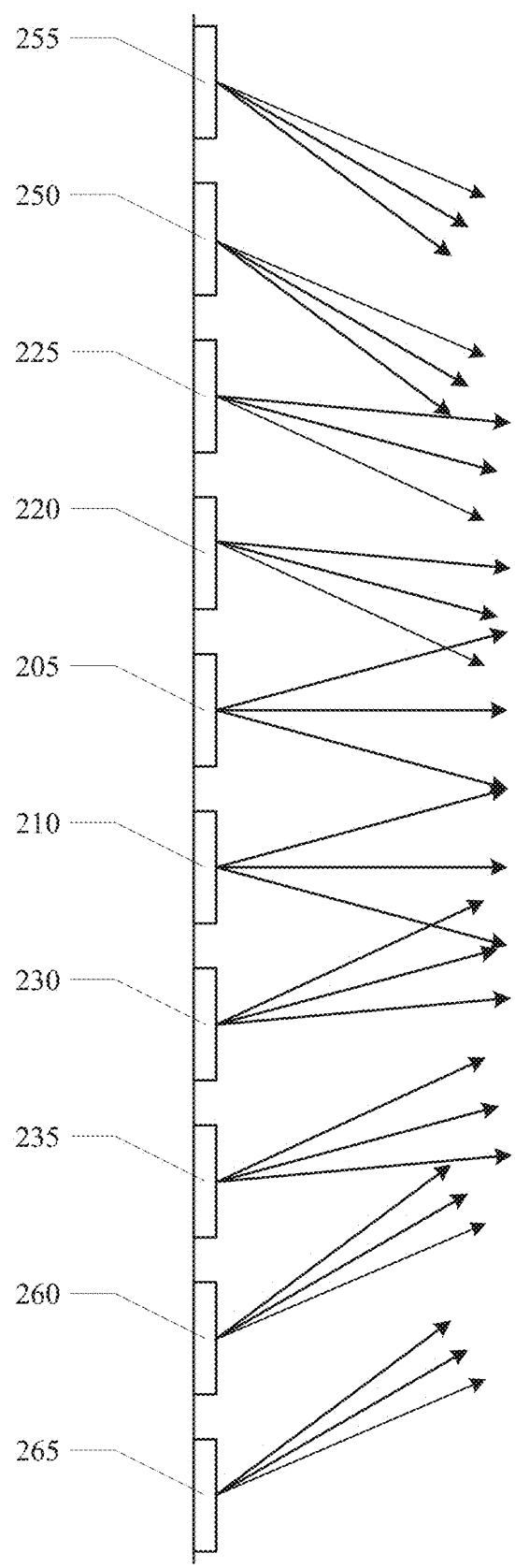
FIG. 4 is a diagram illustrating adjusting a combination of beam divergence and beam direction as a function of a plurality of regions of a planar display in accordance with an example embodiment.

In yet another embodiment, the personal display component can include an array of light sources 105-120, a beam divergence controller 125 and a beam direction controller 130. The beam divergence controller 125 can be configured to vary a beam divergence of the light sources 105-120 as a function of a plurality of regions of the array of light sources 105-120, while the beam direction controller 130 can be configured to vary a beam direction of the light sources 105-120 as a function of the plurality of regions of the array of light sources 105-120. For example, as illustrated in FIG. 4, the beam divergence controller 125 can configure a subset of pixels 205, 210 at the center of the array to have a first FWHM value, a second subset of pixels 220-235 on either side of the center pixels 205, 210 to have a second FWHM value that is less than the first FWHM value, and a third subset of pixels 250-265 out at either end to have a third FWHM value that is less than the second FWHM value. In addition, the beam direction controller 130 can configure the subset of pixels 205, 210 at the center of the array to have a first beam angle, the second subset of pixels 220-235 on either side of the center pixels 205, 210 to have a second beam angle that is less than the first beam angle, and the third subset of pixels 250-265 out at either end to have a third beam angle that is less than the second beam angle.

In one aspect, the beam divergence controller 125 can be implemented at the light emitting element level. In one implementation, the array of light sources can include a plurality of Resonant Cavity Light Emitting Diodes (RCLED), wherein the resonant cavity can perform the function of the beam divergence controller 125 to control the divergence of light emitted from the RCLEDs as a function of the location of the respective RCLED. In another implementation, the array of light sources may include a plurality of light emitting elements with micro-lenses attached thereto. The micro-lenses can perform the function of the beam divergence controller 125 to control the divergence of light emitted from the light emitting elements as a function of the location of the respective micro-lens.

Figure 5:
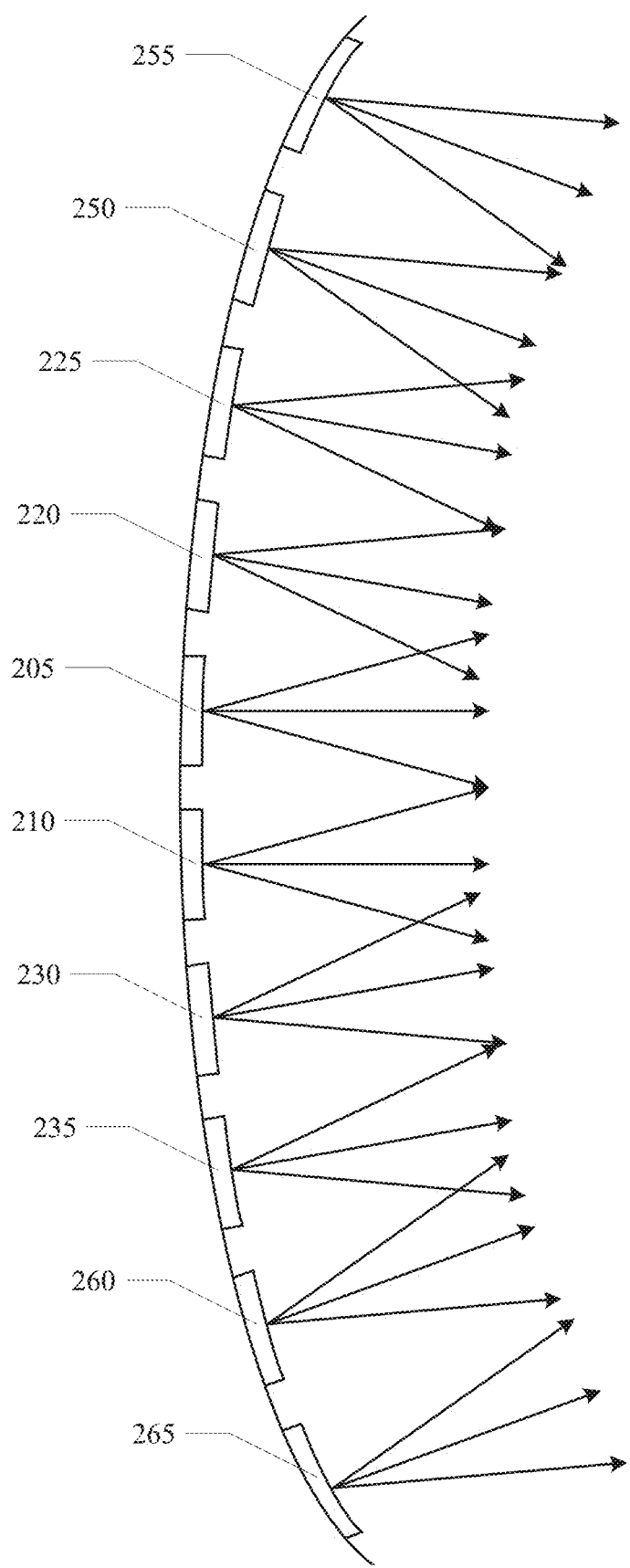
FIG. 5 is a diagram illustrating adjusting a beam direction as a function of a curved display in accordance with an example embodiment.
Figure 6:
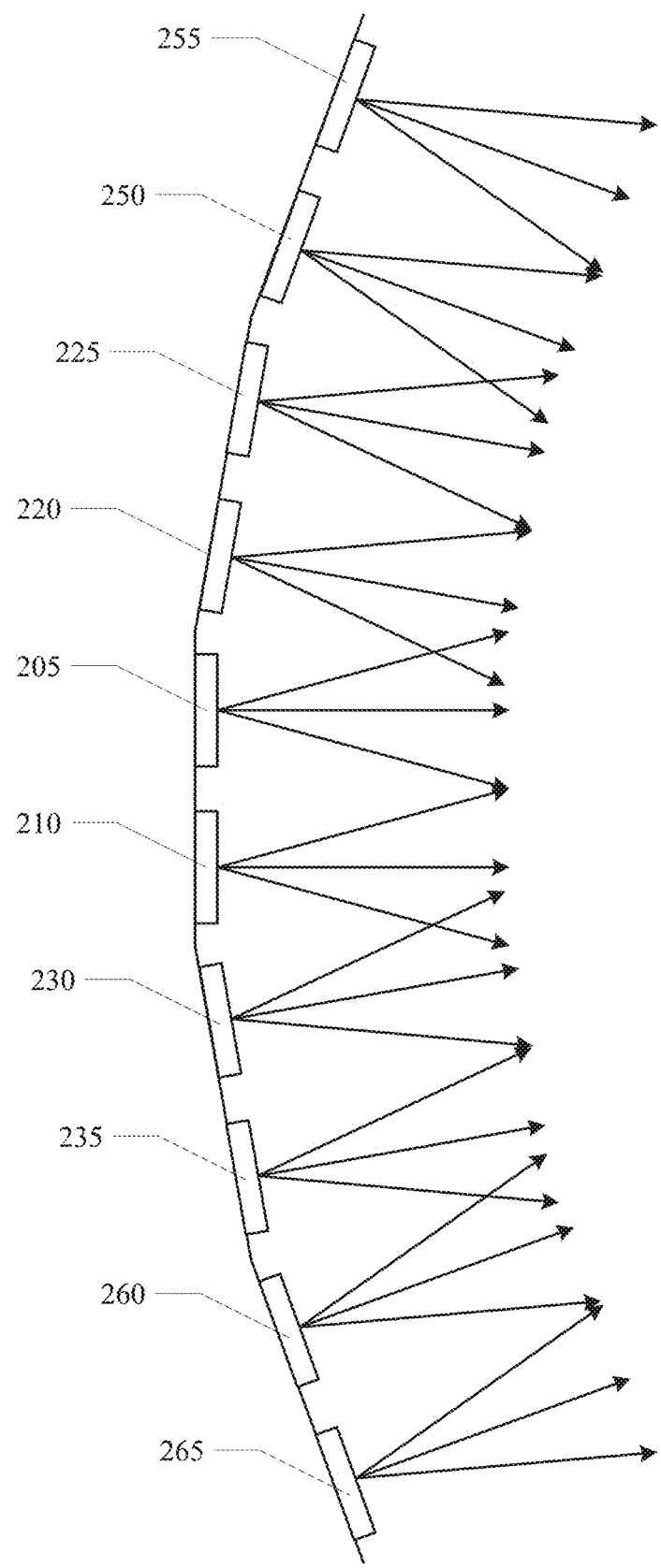
FIG. 6 is a diagram illustrating adjusting a beam direction as a function of a plurality of regions of a curved display in accordance with an example embodiment.

In one aspect, the beam direction controller 130 can be implemented at the personal display component level. In one implementation, the array of light sources 105-120 can be arranged in a curve along one or more axis of the array to perform the function of the beam direction controller 130 to control the beam direction of the light sources as a function of the plurality of regions of the array of light sources. The curve may be a substantially uniform arch as illustrated in FIG. 5, or can be piecewise linear as illustrated in FIG. 6. In a substantially uniform arch, the beam divergence profile may get narrower as pixels are further from the center. In a piecewise linear curve, the beam divergence profile can be the same in each linear portion and get narrower as linear portions are further from the center. In another implementation, the beam direction controller 130 can include a plurality of prisms configured to control the beam direction as a function of the location of the respective prism. In another implementation, the beam direction controller 130 can include a directional grating array configured to control the beam direction as a function of a plurality of regions of the multi-direction grating. In yet another implementation, the beam direction controller 130 can be a directional metasurface configured to control beam direction as a function of a plurality of regions of the directional metasurface. The prisms, multi-direction grating, directional metasurface, or the like can be implemented in a thin film overlaying the array of light sources 105-120.

Figure 7:
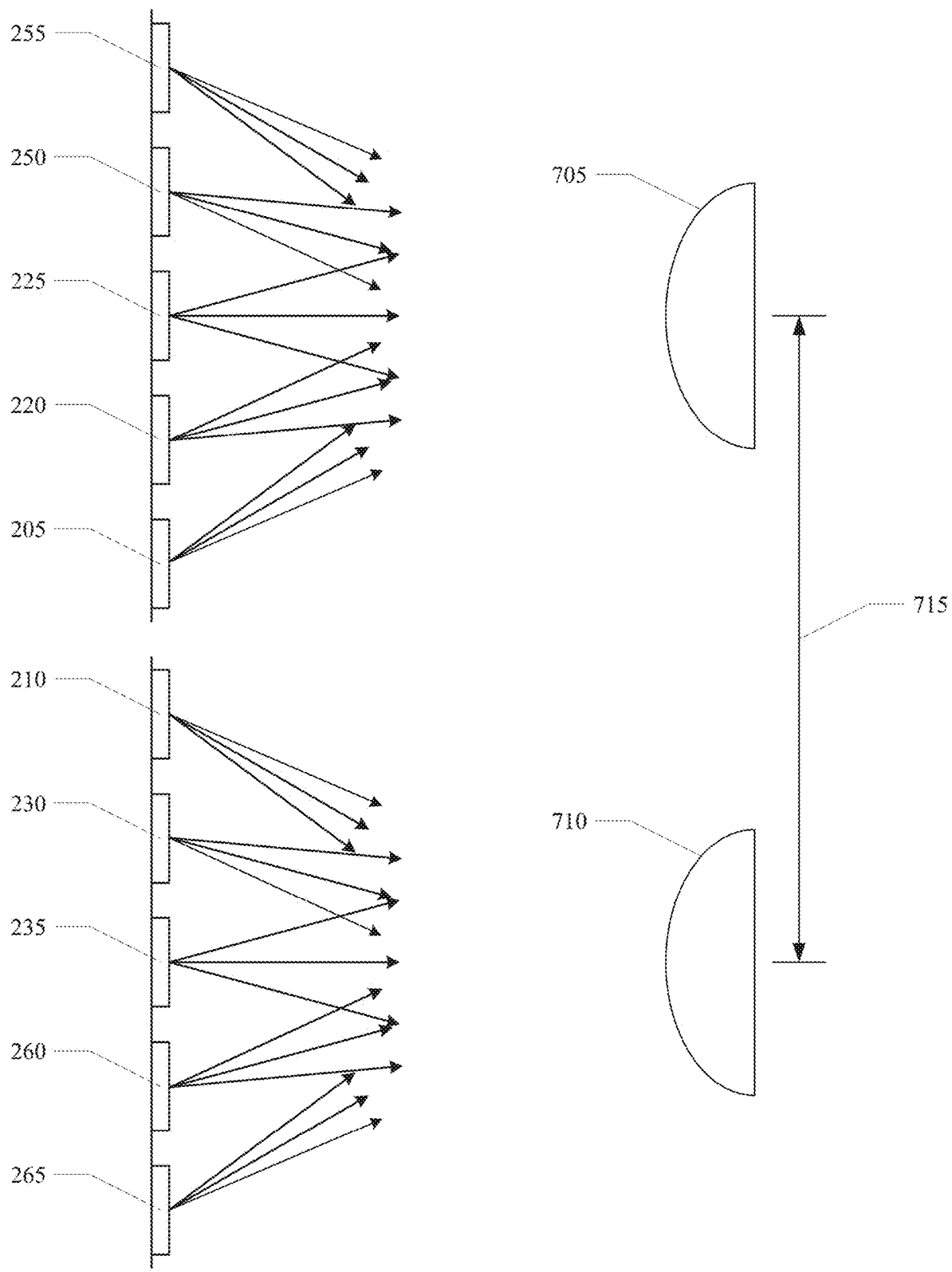
FIG. 7 is a diagram illustrating adjusting a combination of beam divergence and beam direction as a function of a plurality of regions of a planar display for coupling light to one or more lenses in accordance with an example embodiment.

In one aspect, the personal display component can further include one or more converging lenses. In one implementation, the personal display component can include a pair of converging lenses 705, 710 spaced apart by a predetermined interpupillary distance 715, as illustrated in FIG. 7. In one implementation, a separate flat or curved display component maybe associated with each lens. In another implementation, a flat display may be arranged in two portions, with each portion associated with a respective lens. In such cases, the center of the separate displays, or portions of the single display can be aligned with an optical axis of the respective lens. In one implementation, one or more lenses can also be stacked along an optical axis for bitter image quality. The array of light sources can be disposed approximately at a focal point of the converging lenses. In one implementation, the array of light sources are disposed at a distance that is less than the focal length spacing between the lenses and the array of light sources. The array of light source can be with the focal distance with a formed virtual image at infinity or several feet away. The beam divergence controller 125, the beam direction controller 130, or both, can be configured to vary the beam divergence, beam direction or both divergence and direction, of the light sources to increase the capture of light from the array of light sources 105-120 by the converging lenses. By controlling the beam divergence, the beam divergence controller 125 can also increase the light capture by the one or more converging lenses 705, 710, and/or reduce vignetting (e.g., dark edges). Similarly, by controlling the beam direction, the beam direction controller 130 can also increase the light capture by the one or more converging lenses 705, 710, and/or reduce vignetting (e.g., dark edges). In one implementation, the curvature of the array of light sources 105-120 along two axes can increase the Field of View (FOV) for a given size of the array by up to 15%, as compared to a planar array of light sources 105-120. Similarly, the curvature of the array of light sources 105-120 along two axes can increase the resolution for a given size of the array by up to 50%, as compared to a planar array of light sources 105-120. In addition, tradeoffs can be made between the FOV and the resolution to optimize performance of the personal display component.

In one aspect, the beam divergence controller 125, the beam direction controller 130 or both can be configured to dynamically adjust the beam divergence, the beam direction or both divergence and direction, of the plurality of light sources 105-120 to vary in a first mode, and adjust the beam divergence, the beam direction or both, to be substantially constant for the plurality of light sources 105-120 in a second mode. In one example, the beam divergence can be dynamically adjusted by controlling a distance between a micro lens and light emitting element. Alternatively or additionally, the beam direction can be dynamically adjusted by controlling the pitches of prisms or effective phase profile of prisms in a variable direction optical film. Beam direction can also be adjusted by varying the pitch of the grating implemented with a liquid crystal.

Figure 8:
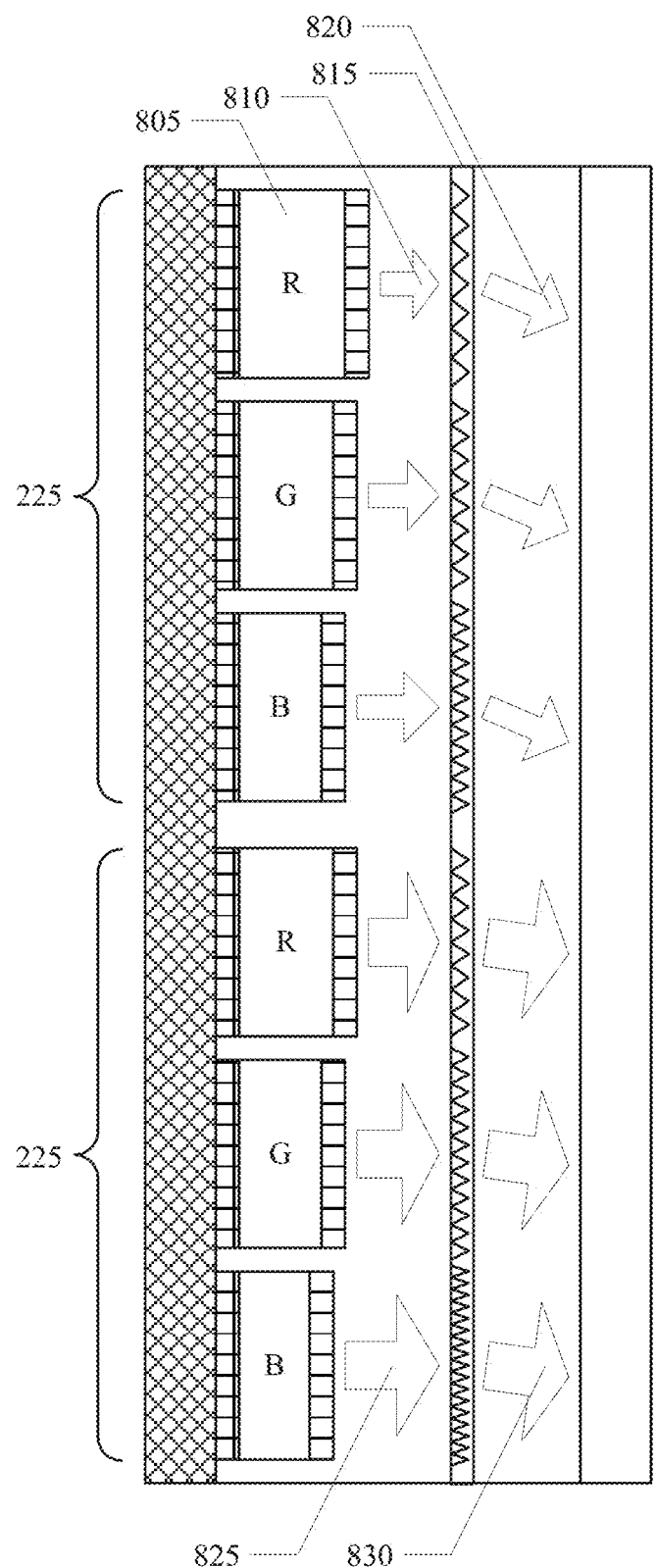
FIG. 8 is a diagram illustrating adjusting a combination of beam divergence and beam direction as a function of a plurality of regions of a planar display in accordance with an example embodiment.

In one aspect, beam divergence control, beam direction control or both, can be applied one a set of pixel basis or on a per pixel basis. For example, the beam divergence controller 125 can vary the beam divergence of the light sources 105-120 for each set of a predetermined number of rows and/or columns of the arrays, for each set of a block of pixels, and for each individual pixel. Similarly, the beam direction controller 130 can vary the beam direction of the light sources 105-120 for each set of a predetermined number of rows and/or columns of the arrays, for each set of blocks of pixels, and for each individual pixel. In addition, beam divergence control, beam direction control or both, can also be applied on a per-wavelength basis. For example, the beam divergence controller can vary the beam divergence for the different sub-pixels of the light sources 105-120. As illustrated in FIG. 8, the resonant cavity 805 for a red (R), green (G) and blue (B) sub-pixels of a given pixel 225 may be varied based upon the wavelength of light to achieve substantially the same beam divergence 810 for each subpixel in the given pixel 825. Alternatively or additionally, a pitch of prims in a directional optical film 815 may be varied based on the wavelength of light to achieve substantially the same beam direction 820 for each subpixel in the given pixel 225. Furthermore, beam divergence 810, 825 and/or beam direction 820, 830 can be varied based on the location of the pixels 225, 250 in the personal display component.

In one aspect, varying the beam divergence of the light sources 105-120 as a function of the plurality of regions of the array of light sources 105-120 can increase the light transmitted to the eye for the light sources 105-120 further away from the center of the array. Likewise, varying the beam direction of the light sources 105-120 as a function of the plurality of regions of the array of light sources 105-120 can increase the light transmitted to the eye for the light sources 105-120 further away from the center of the array. As a result, controlling the beam divergence and/or the beam direction of the light sources based on the location of the light sources 105-120 in the array can increase the efficiency of the display by as much as 2-3 times, as compared to an array of light sources 105-120 with substantially uniform beam divergence and beam direction across the array.

Figure 9:
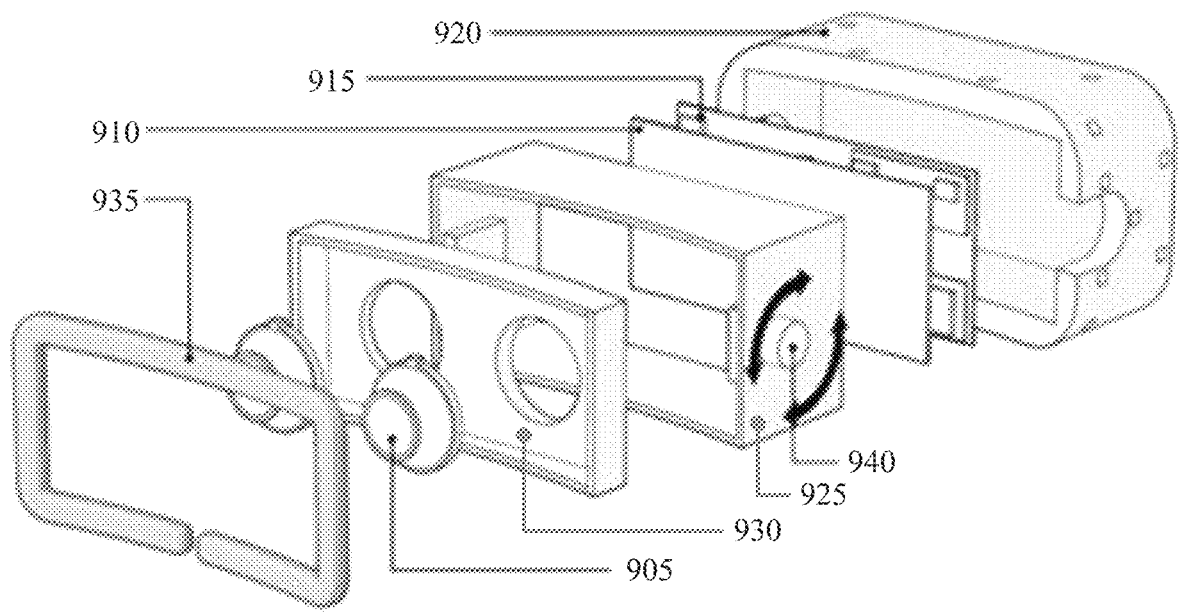
FIG. 9, is a diagram illustrating a Head Mounted Display (HMD) in accordance with an example embodiment.

FIG. 9 is a diagram illustrating a Head Mounted Display (HMD) in accordance with an example. The HMD can include one or more lenses 905, one or more displays 910, 915 and one or more housing form factors 920-935 configured to dispose the one or more displays 910 at a predetermined distance from the one or more lenses 905. The predetermined distance can be approximately equal to a focal length of the one or more lenses.

In one implementation, the one or more displays 910 can include one or more arrays of light sources, and one or more circuit boards 915. In one implementation, the one or more displays 910 can be planar displays. In another implementation, the one or more displays 910 can be curved displays.

In one aspect, the one or more displays 910 can be configured to adjust an emission spread of light from a plurality of pixels of the one or more displays 910 based on distance of respective pixels from a center of a respective one of the displays 910. In addition, the one or more displays 910 can be configured to adjust the emission spread of light from the plurality of pixels further based on a collection angle of the one or more lenses 905.

In another aspect, the one or more displays 910 can be configured to adjust an emission direction of the light from the plurality of pixels of the one or more displays 910 based on the distance of respective pixels from the center of the respective one of the displays 910. In addition, the one or more displays 910 can be configured to adjust the emission direction of light from the plurality of pixels further based on a collection angle of the one or more lenses 905.

In another aspect, the one or more displays 910 can be configured to adjust the emission spread and direction of the light from the plurality of pixels of the one or more displays 910 based on the distance of respective pixels from the center of the respective one of the displays 910. Likewise, the one or more displays 910 can be configured to adjust the emission spread and direction of light from the plurality of pixels further based on a collection angle of the one or more lenses 905.

In yet another aspect, the one or more displays 910 can be configured to dynamically adjust the emission spread and/or direction of the light from the plurality of pixels of the one or more displays 910 based on the distance of the respective pixels from the center of the respective one of the displays 910 in a first mode, and adjust the emission spread and/or direction of the light to be substantially constant from the plurality of pixels of the one or more displays 910 in a second mode.

In one aspect, varying the beam divergence of the light from the plurality of pixels based on the distance of respective pixels from the center of the respective one of the displays 910 can increase the light captured by the one or more lenses. Likewise, varying the beam direction of the light from the plurality of pixels based on the distance of respective pixels from the center of the respective one of the displays 910 can increase the light captured by the one or more lenses 905. The more light that is captured by the one or more lenses 905 generally also corresponds to a reduction in light noise within the HMD. As a result, controlling the beam divergence and/or the beam direction of the light based on the location of the pixels in the display 910 can increase the efficiency of the display 910 by as much as 2-3 times, as compared to a display with substantially uniform beam divergence and beam direction across the pixels of the display.

In one aspect, one or more of the displays 910 can be removably couplable to the one or more housing form factors. A removably couplable display 910 can be a cell phone, a smart phone, a tablet, a phablet, a netbook, an e-book reader, and a handheld game console. For example, the one or more housing form factors 920-935 of the HMD may be configured for a cell phone to be inserted for use in the HMD. When the cell phone is inserted in the HMD, the screen of the cell phone can be configured to adjust the emission spread and/or direction of the light from the plurality of pixels of the screen based on the distance of the respective pixels from the center of the screen in a first mode. When the cell phone is removed from the HMD, the emission spread and/or direction of the light from the screen can be reconfigured to be substantially constant across all the pixel in the screen. In another aspect, the one or more displays 910 can be integral to the HMD.

In one aspect, the one or more housing form factors 920-935 can include a cover 920, a display frame 925, a lens retainer 930, and a user mechanical interface 935. The lens retainer 930 and display frame 925 can be configured to retain the one or more lenses 905 in a selected orientation to the one or more displays 910 for viewing the one or more displays 910, 915 through the one or more lenses 905 by a user. The display frame 925 can be mechanically coupled between the lens frame 930 and the one or more displays 910. The display frame 925 can be configured to dispose the one or more displays 910 at a distance from the one or more lenses 905 substantially equal to the focal length of the one or more lenses 905. The user mechanical interface 935 can be configured to couple to a user and to enable the user to view the one or more displays 910 through the one or more lenses 905. The user mechanical interface 935 can be coupled to the cover 920 and/or display frame 925. In one instance, the user mechanical interface 935 can be a face pad and a strap for securing the HMD to the head of a user. The cover 920 can be configured to enclose the one or more lenses 905, the lens frame 930, the one or more displays 910, and the display frame 925.

In one aspect, the one or more displays 910 can include a first portion and a second portion and the one or more lenses 905 can include a first lens and a second lens. The lenses 905 can be spaced apart by a predetermined interpupillary distance. In such case, the first lens can be configured to converge light emissions from the first portion of the display panel and the second lens can be configured converge light emissions from the second portion of the display panel. In another implementation, the one or more displays 910 can include a first display panel and a second display panel and the one or more lenses 905 can include a first lens and a second lens. The first lens can be configured to converge light emissions from the first display panel and the second lens can be configured to converge light emissions from the second display panel.

In one implementation, the one or more displays can be configured to adjust the emission spread of light from between 30° and 60° for one or more pixels substantially in the center of the display, and from 10° and 40° for one or more pixels furthest from the center of the display. Alternatively or additionally, the one or more displays can be configured to adjust the emission angle of light from 0° for the one or more pixels substantially in the center of the display, and from between 10° and 30° for one or more pixels further from the center of the display.

In one aspect, parameters of the one or more displays 910, parameters of the one or more lenses 905, the distance between the one or more lenses 905 and the one or more displays 910, and/or the interpupillary distance between the lenses 905 can be adjusted to achieve a specified size and weight of the HMD, a specified FOV, a specified resolution, and/or the like. For a flat screen display 910, for example, a screen with a planar width of 65 mm, and a lens having a focal length of 48.8 mm, can have a horizontal 74° FOV. A flat screen display 910 having a planar width of 55 mm, and a lens having a focal length of 42.1 mm, can achieve a horizontal 70° FOV. A flat screen display 910 having a planar width of 65 mm, and a lens having a focal length of 55.3 mm, can achieve a horizontal 83° FOV. A flat screen display 910 having a planar width of 55 mm, and a lens having a focal length of 32.9 mm, can achieve a horizontal 80° FOV. For a curved screen display 910, a screen having an arch width of 65.5 mm, and a lens having a focal length of 48.8 mm, can achieve a horizontal 83° FOV. A curved screen display 910 having an arch width of 55.2 mm, and a lens having a focal length of 35.4 mm, can achieve a horizontal 79.2° FOV. A curved screen display 910 having an arch width of 65.5 mm, and a lens having a focal length of 44.1 mm, can achieve a horizontal 83° FOV. A curved screen display 910 having an arch width of 55.1 mm, and a lens having a focal length of 33.9 mm, can achieve a horizontal 80° FOV.

Figure 10:
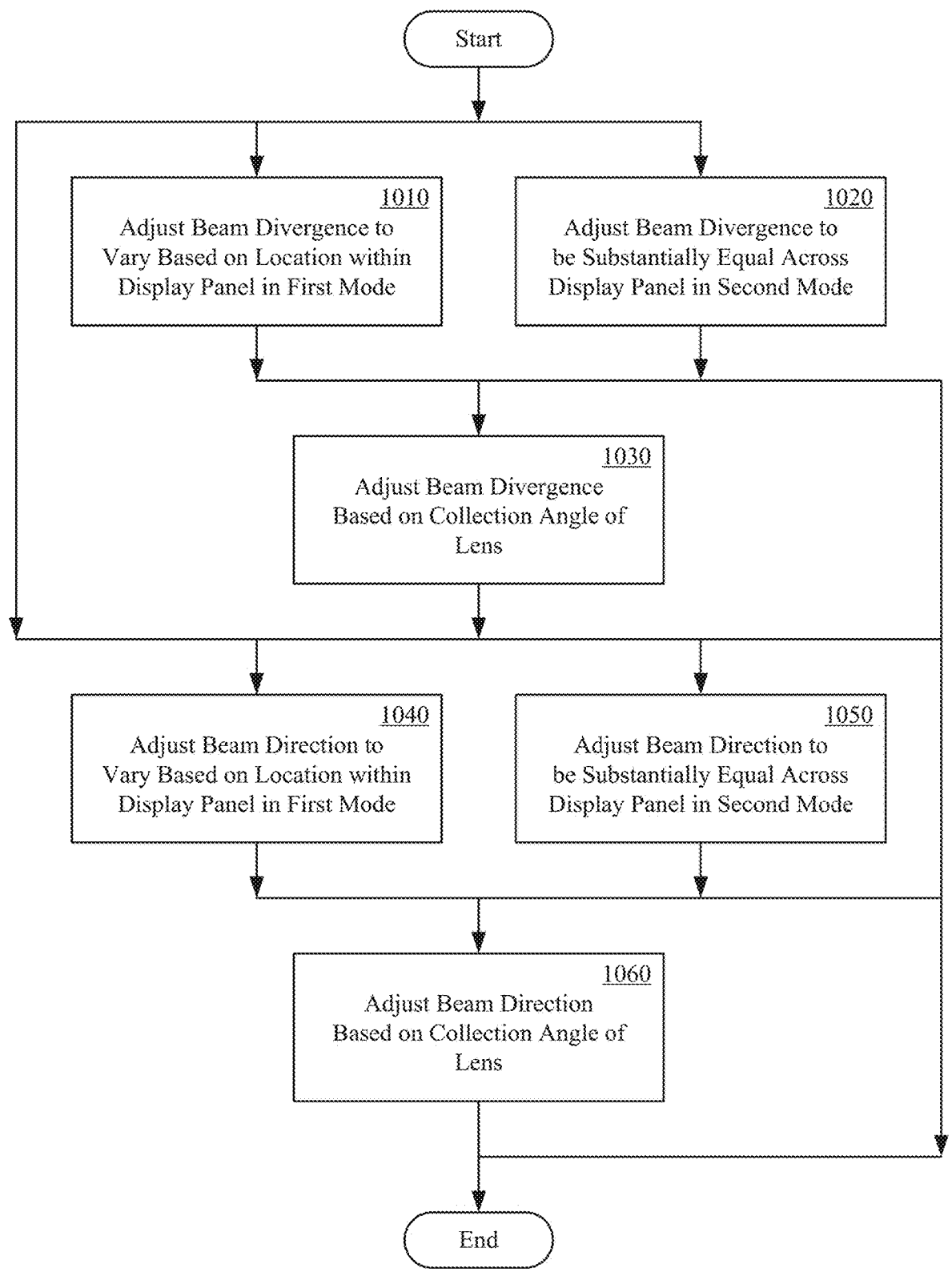
FIG. 10 is a block diagram illustrating a HMD method of operation in accordance with an example embodiment.

FIG. 10 illustrates a HMD method of operation in accordance with an example. The method can include adjusting a beam divergence for a plurality of display regions of a display panel based on a distance of a respective display region from a center of the display panel in a first mode 1010. In a second mode, the beam divergence at the plurality of display regions of the display panel can be adjusted to be substantially equal for the plurality of display regions 1020. The beam divergence for the plurality of display regions of the display panel can be further adjusted based on a collection angle of a lens configured to converge light from the display panel in the first mode 1030. In one implementation, a divergence controller can be configured to adjust the beam divergence for the given mode. In one implementation, the divergence controller can be implemented at the light source level of the display panel.

Alternatively or additionally to the beam divergence, a beam direction for the plurality of display regions of the display based on the distance of the respective display region from the center of the display in the first mode 1040. In a second mode, the beam direction of the plurality of display regions of the display can be, alternatively or additionally to the beam divergence, adjusted to be substantially equal for the plurality of display regions 1050. The beam direction for the plurality of display regions of the display can be further adjusted based on the collection angle of the lens configured to converge light from the display in the first mode 1060. In one implementation, a direction controller can be configured to adjust the beam direction for the given mode. In one implementation, the direction controller can be implemented at the display panel level.

In one implementation, the first mode can be when the display panel is coupled to the HMD, such as when a smart phone is inserted for use in a Virtual Reality (VR) HMD. The second mode can be when the display panel is being used separately from the HMD, such as when the smart phone is used as a standalone device.

Figure 11:
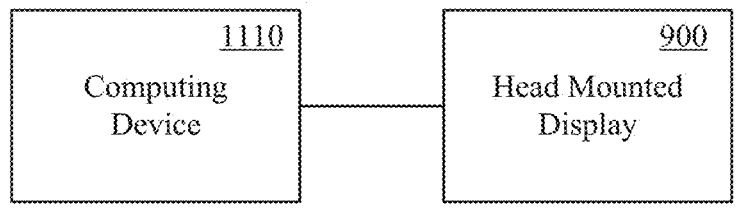
FIG. 11 is a block diagram illustrating a computing system in accordance with an example embodiment.

FIG. 11 is a block diagram illustrating a computing system in accordance with an example. The computing system can include a computing device 1110 and HMD 900. The HMD can include one or more lenses 905, one or more displays 910, 915 and one or more housing form factors 920-935 configured to dispose the one or more displays 910 at a predetermined distance from the one or more lenses 905, as described above with reference to FIG. 9. The computing device 1110 can provide content for output on the one or more displays 910, 915 of the HMD 900. The computing device 1110 can be a smart phone, a smart watch, a Head Mounted Display (HMD), a tablet Personal Computer (PC), a laptop PC, a desktop PC, a television, a personal gaming unit or other similar device.

Embodiments of the present technology advantageously control a beam divergence and/or a beam direction of light from a display device based on the location of the light source elements within the display device. Controlling the beam divergence and/or beam angle based on the location of the light source elements within the display device can advantageously be utilized to reduce the size and weight of the display device. Controlling the beam divergence and/or beam angle based on the location of the light source elements within the display device can also be utilized to improve the Field of View (FOV) and/or resolution for a given display device size. Controlling the beam divergence and/or beam angle based on the location of the light source elements within the display device can also advantageously increase the light captured by the eyes. In such case, the intensity of the light can be reduced, which can reduce power consumption by the display device. The display device can advantageously be utilized in a Head Mounted Display (HMD) of a device.

Examples

The following examples pertain to specific technology embodiments and point out specific features, elements, or steps that may be used or otherwise combined in achieving such embodiments.

In one example there is provided, a personal display component comprising an array of light sources, and either a beam divergence controller, a beam direction controller, or both a beam divergence controller and a beam direction controller, coupled to the array of light sources, wherein the beam divergence controller is configured to vary a beam divergence of the light sources as a function of a plurality of regions of the array of light sources and wherein the beam direction controller is configured to vary a beam direction of the light sources as a function of the plurality of regions of the array of light sources.

In one example of a personal display component, the component further comprises: a converging lens, wherein the array of light sources are disposed approximately at a focal point of the converging lens, and wherein the divergence control is configured to vary the beam divergence of the light sources as a function of the plurality of regions of the array of light sources to increase a capture of light from the array of light sources by the converging lens.

In one example of a personal display component, the display further comprises: a converging lens, wherein the array of light sources are disposed approximately at a focal point of the converging lens, and wherein the direction control is configured to vary the beam direction of the light sources as a function of the plurality of regions of the array of light sources to increase a capture of light from the array of light sources by the converging lens.

In one example of a personal display component, the array of light sources are arranged in a curve along one or more axes of the array to vary a beam direction of the light sources as a function of the plurality of regions of the array of light sources.

In one example of a personal display component, the beam divergence controller is further reconfigurable to uniformly control the beam divergence of the array of light sources.

In one example of a personal display component, the beam direction controller is further reconfigurable to uniformly control the beam direction of the array of light sources.

In one example of a personal display component, the array of light sources comprises a plurality of resonant cavity light emitters, and the beam divergence controller is configured to control the beam divergence of the plurality of resonant cavity light emitters as a function of the location of the respective resonant cavity light emitter.

In one example of a personal display component, the array of light sources comprises a plurality of light emitting elements with micro-lenses, and the beam divergence controller is configured to control the beam divergence of the plurality of micro-lenses as a function of the location of the respective micro-lens.

In one example of a personal display component, the beam direction controller comprises a plurality of prisms configured to control beam direction as a function of the location of the respective prism.

In one example of a personal display component, the beam direction controller comprises a directional grating array configured to control beam direction as a function of a plurality of regions of the directional grating array.

In one example of a personal display component, the beam direction controller comprises a directional metasurface configured to control beam direction as a function of a plurality of regions of the directional metasurface.

In one example there is provided a personal display device comprising: a display panel including a plurality of light sources, and either a beam divergence controller, or a beam direction controller, or both a beam divergence controller and a beam direction controller, wherein said beam divergence controller is coupled to the display panel and configured to vary a beam divergence of the plurality of light sources as a function of a plurality of regions of the display panel, and wherein said beam direction controller is coupled to the display panel and configured to vary a beam direction of the plurality of light sources as a function of a plurality of regions of the display panel.

In one example of a personal display device, the personal display is configured as a Head Mounted Display (HMD).

In one example of a personal display device, the personal display is configured to removably couple to a Head Mounted Display (HMD).

In one example of a personal display device, the beam divergence controller is configured to vary the beam divergence of the light sources as a function of the plurality of regions of the display panel when the display panel is coupled to the HMD, and configured to uniformly control the beam divergence of the light sources when the display panel is uncoupled from the HMD.

In one example of a personal display device, the plurality of light sources comprises a plurality of resonant cavity light emitters, and the beam divergence controller is configured to control the beam divergence of the plurality of resonant cavity light emitters as a function of the location of the respective resonant cavity light emitter.

In one example of a personal display device, the plurality of light sources comprises a plurality of light emitting elements with micro-lenses, and the beam divergence controller is configured to control the beam divergence of the plurality of micro-lenses as a function of the location of the respective micro-lens.

In one example of a personal display device, the beam direction controller is configured to vary a beam direction of the light sources as a function of the plurality of regions of the display panel when the personal display is coupled to the HMD, and configured to uniformly control the beam direction of the light sources when the display panel is uncoupled from the HMD.

In one example of a personal display device, the beam direction controller comprises a plurality of prism configured to control beam direction as a function of the location of the respective prism.

In one example of a personal display device, the beam direction controller comprises a directional grating array configured to control beam direction as a function of a plurality of regions of the directional grating array.

In one example of a personal display device, the beam direction controller comprises a directional metasurface configured to control beam direction as a function of a plurality of regions of the directional metasurface.

In one example there is provided, a head mounted display (HMD) comprising: one or more lenses, one or more displays configured to adjust an emission spread, an emission direction, or both an emission spread and an emission direction, of light from a plurality of pixels of the one or more displays based on one or more of: a distance of respective pixels from a center of a respective one of the displays, a distance of the respective pixels from the center of a respective one of the displays, and a collection angle of the one or more lenses, one or more housing form factors configured to dispose the one or more displays at a distance from the one or more lenses approximately equal to or less than a focal length of the one or more lenses.

In one example of an HMD, the one or more displays are configured to adjust the emission spread of the light from the plurality of pixels.

In one example of an HMD, the one or more displays are configured to adjust the emission direction of the light from the plurality of pixels.

In one example of an HMD, the one or more displays is adjusted based on a distance of the respective pixels from a center of a respective one of the displays.

In one example of an HMD, the one or more displays is adjusted based on a distance of the respective pixels from the center of a respective one of the displays.

In one example of an HMD, the one or more displays is adjusted based on a collection angle of the one or more lenses.

In one example of an HMD, the HMD further comprises a controller configured to dynamically adjust the emission spread of the light from the plurality of pixels of the one or more displays based on the distance of the respective pixels from the center of the respective one of the displays in a first mode, and adjust the emission spread of the light to be substantially constant from the plurality of pixels of the one or more displays in a second mode.

In one example of an HMD, the one or more displays include a display that is removably couplable to the one or more housing form factors.

In one example of an HMD, the display removably couplable to the one or more housing form factors comprises a device selected from a group consisting of a cell phone, a smart phone, a tablet, a phablet, a netbook, an e-book reader, and a handheld game console.

In one example of an HMD, the one or more displays comprise one or more curved displays.

In one example of an HMD, the display comprises a panel including a plurality of resonant cavity pixels configured to adjust the emission spread of light from the plurality of pixels of the display based on the distance of the respective pixels from the center of the display and the collection angle of the lens.

In one example of an HMD, the display comprises a panel including the plurality of pixels and a plurality of micro-lenses disposed on the plurality of pixels, wherein the plurality of micro-lenses are configured to adjust the emission spread of light from the plurality of pixels of the display based on the distance of the respective pixels from the center of the display and the collection angle of the lens.

In one example of an HMD, the emission spread of light from the plurality of pixels of the display is adjusted from between 30° and 60° for one or more pixels substantially in the center of the display and from 10° and 40° for one or more pixels furthest from the center of the display.

In one example of an HMD, the display includes: a panel including the plurality of pixels, and a thin film prism array configured to adjust the emission direction angle of light from the plurality of pixels based on the distance of the respective pixels from the center of the display and the collection angle of the lens.

In one example of an HMD, the display includes: a panel including the plurality of pixels, and a thin film diffraction grating configured to adjust the emission direction angle of light from the plurality of pixels based on the distance of the respective pixels from the center of the display and the collection angle of the lens.

In one example of an HMD, the one or more housing form factors include: a lens retainer configured to retain the one or more lenses in a selected orientation to the one or more displays and orientation for viewing the one or more displays through the one or more lenses by a user, a display frame mechanically coupled between the lens retainer and the one or more displays, the display frame configured to dispose the one or more displays at the distance from the one or more lenses substantially equal to the focal length of the one or more lenses, a user mechanical interface configured to couple to a user and to enable the user to view the one or more displays through the one or more lenses, and a cover configured to enclose the one or more lenses, the one or more displays, and the lens retainer, wherein the user mechanical interface is coupled to the cover.

In one example of an HMD, the cover is further configured to shroud one or more eyes of a user from light outside the one or more housing form factors.

In one example of an HMD, the one or more housing form factors are further configured to shroud one or more eyes of a user from light not collected by the lens.

In one example of an HMD, the one or more displays include a display panel including a first portion and a second portion, and the one or more lenses include a first lens and a second lens spaced apart by a predetermined interpupillary distance, wherein the first lens is configured to converge light emissions from the first portion of the display panel and the second lens is configured to converge light emissions from the second portion of the display panel.

In one example of an HMD, the one or more displays include a first display panel and a second display panel, and the one or more lenses include a first lens and a second lens spaced apart by a predetermined interpupillary distance, wherein the first lens is configured to converge light emissions from the first display panel and the second lens is configured to converge light emissions from the second display panel.

In one example of an HMD, the one or more displays include a display removably couplable to the one or more housing form factors.

In one example of an HMD, the display removably couplable to the one or more housing form factors comprises a device selected from a group consisting of a cell phone, a smart phone, a tablet, a phablet, a netbook, an e-book reader, and a handheld game console.

In one example there is provided, a personal display system comprising: a computing device, and a personal display component as recited herein, a personal display device as recited herein, a head mounted display (HMD) as recited herein, or a combination thereof, configured to operably couple to the computing device.

In one example of a personal display system, the computing device comprises a smart phone, a smart watch, a Head Mounted Display (HMD), a tablet Personal Computer (PC), a laptop PC, a desktop PC, a television, or a personal gaming unit.

In one example there is provided a method of making a personal display comprising: communicatively coupling an array of light sources with a beam divergence controller, a beam direction controller, or both a beam divergence controller and a beam direction controller, wherein the beam divergence controller is configured to vary a beam divergence of the light sources as a function of a plurality of regions of the array of light sources, and wherein the beam direction controller is configured to vary a beam direction of the light sources as a function of the plurality of regions of the array of light sources.

In one example of a method of making a personal display, the method further comprises: providing a converging lens, and positioning the array of light sources approximately at a focal point of the converging lens.

In one example of a method of making a personal display, the method further comprises configuring the beam divergence controller to vary the beam divergence of the light sources as a function of the plurality of regions of the array of light sources to increase a capture of light from the array of light sources by the converging lens.

In one example of a method of making a personal display, the method further comprises configuring the beam direction controller to vary the beam direction of the light sources as a function of the plurality of regions of the array of light sources to increase a capture of light from the array of light sources by the converging lens.

In one example of a method of making a personal display, the method further comprises configuring both the beam divergence controller and the beam direction controller to respectively vary the beam divergence and the beam direction of the light sources as a function of the plurality of regions of the array of light sources to increase a capture of light from the array of light sources by the converging lens.

In one example of a method of making a personal display, the method further comprises arranging the array of light sources in a curve along one or more axes of the array to vary a beam direction of the light sources as a function of the plurality of regions of the array of light sources.

In one example of a method of making a personal display, the beam divergence controller is further reconfigurable to uniformly control the beam divergence of the array of light sources.

In one example of a method of making a personal display, the beam direction controller is further reconfigurable to uniformly control the beam direction of the array of light sources.

In one example of a method of making a personal display, the array of light sources comprises a plurality of resonant cavity light emitters, and the beam divergence controller is configured to control the beam divergence of the plurality of resonant cavity light emitters as a function of the location of the respective resonant cavity light emitter.

In one example of a method of making a personal display, the array of light sources comprises a plurality of light emitting elements with micro-lenses, and the beam divergence controller is configured to control the beam divergence of the plurality of micro-lenses as a function of the location of the respective micro-lens.

In one example of a method of making a personal display, the beam direction controller comprises a plurality of prisms configured to control beam direction as a function of the location of the respective prism.

In one example of a method of making a personal display, the beam direction controller comprises a directional grating array configured to control beam direction as a function of a plurality of regions of the directional grating array.

In one example of a method of making a personal display, the beam direction controller comprises a directional metasurface configured to control beam direction as a function of a plurality of regions of the directional metasurface.

In one example of a method of making a personal display, the personal display is a head mounted display (HMD).

In one example of a method of making a personal display, the method further comprises adjusting a beam divergence for a plurality of display regions of the display based on a distance of a respective display region from a center of the display in a first mode, and adjusting the beam divergence at the plurality of display regions of the display to be substantially equal for the plurality of display regions in a second mode.

In one example of a method of making a personal display, the method further comprises adjusting the beam divergence for the plurality of display regions of the display further based on a collection angle of a lens configured to converge light from the display in the first mode.

In one example of a method of making a personal display, the method further comprises adjusting a beam direction for the plurality of display regions of the display based on the distance of the respective display region from the center of the display in a first mode; and adjusting the beam direction of the plurality of display regions of the display to be substantially equal for the plurality of display regions in the second mode.

In one example of a method of making a personal display, the method further comprises adjusting the beam direction for the plurality of display regions of the display further based on the collection angle of the lens configured to converge light from the display in the first mode.

In one example of a method of making a personal display, the method further comprises coupling a computing device to the personal display.

In one example there is provided a method of maximizing visual quality of a personal display, comprising controlling pixel emission profile based on a location of the pixel within the display.

In one example of a method of maximizing visual quality of a personal display, controlling pixel emission profile includes:

In one example of a method of maximizing visual quality of a personal display, adjusting beam divergence, or beam direction, or a combination of beam divergence and beam direction, of light from the pixels as a function of the pixel's location in an array of light sources.

In one example of a method of maximizing visual quality of a personal display, beam divergence is adjusted.

In one example of a method of maximizing visual quality of a personal display, beam direction is adjusted.

In one example of a method of maximizing visual quality of a personal display, both beam divergence and direction are adjusted.

In one example of a method of maximizing visual quality of a personal display, pixel emission profile is directed approximately at a focal point of one or more converging lens.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

The invention claimed is:

1. A personal display to be mounted to an apparatus, the apparatus to be mounted to a head of a user, the personal display comprising:
   an array of light sources;
   a beam divergence controller operatively coupled to the array of light sources, the beam divergence controller to operate in a first mode when the personal display is mounted to the apparatus, the beam divergence controller to operate in a second mode when the personal display is not mounted to the apparatus, in the first mode, the beam divergence controller is to set a first subset of pixels at a first beam divergence and to set a second subset of pixels at a second beam divergence different from the first beam divergence, the first subset of pixels at a center of the array of light sources and the second subset of pixels substantially surrounding the first subset of pixels, and in the second mode, the beam divergence controller is to set all of the array of light sources at a third beam divergence; and
   a beam direction controller operatively coupled to the array of light sources, the beam direction controller to control beam directions of the light sources in the array.

2. The personal display of claim 1, further including a converging lens, wherein the array of light sources are disposed approximately at a focal point of the converging lens.

3. The personal display of claim 1, wherein the array of light sources are along a curve that extends along one or more axes of the array.

4. The personal display of claim 1, wherein the beam direction controller is to control the beam directions of all of the light sources to be aligned.

5. The personal display of claim 1, wherein the array of light sources further includes a plurality of resonant cavity light emitters, the beam divergence controller to control the beam divergence of the plurality of resonant cavity light emitters based on locations of respective ones of the plurality of resonant cavity light emitters.

6. The personal display of claim 1, wherein the array of light sources further includes a plurality of light emitting elements associated with a plurality of micro-lenses, the beam divergence controller to control the beam divergence of the plurality of micro-lenses based on locations of respective ones of the plurality of micro-lenses.

7. The personal display of claim 1, wherein the beam direction controller further includes a plurality of prisms, the beam direction controller to control the beam directions based on locations of respective ones of the plurality of prisms.

8. The personal display of claim 1, wherein the beam direction controller includes a directional grating array to control the beam directions.

9. The personal display of claim 1, wherein the beam direction controller includes a directional metasurface to control the beam directions.

10. The personal display of claim 1, wherein the first beam divergence is greater than the second beam divergence.

11. The personal display of claim 10, wherein the beam divergence controller is to set a third subset of pixels at a fourth beam divergence that is less than the second beam divergence, the third subset of pixels surrounding the second subset of pixels.

12. The personal display of claim 11, wherein the first beam divergence is determined based on a full-width half maximum value of the first subset of pixels, the second beam divergence is determined based on a full-width half maximum value of the second subset of pixels, and the fourth beam divergence is determined based on a full-width half maximum value of the third subsets of pixels.

13. The personal display of claim 12, wherein an emission spread of light of the first subset of pixels is between 30 degrees and 60 degrees, and an emission spread of light of at least one of the second subset of pixels or the third subset of pixels is between 10 degrees and 40 degrees.

14. The personal display of claim 1, wherein the beam direction controller is to set a first subset of light sources in the array to have a first beam angle and a second subset of light sources in the array to have a second beam angle that is less than the first beam angle, the first subset of light sources in the array at a center of the array of light sources and the second subset of light sources in the array on at least one side of the first subset of light sources in the array.

15. A personal display device to be mounted to an apparatus, the apparatus to be mounted to a head of a user, the personal display device comprising:
a display panel including an array of light sources;
a beam divergence controller to control the array of light sources, the beam divergence controller to operate in a first mode when the personal display device is mounted to the apparatus, the beam divergence controller to operate in a second mode when the personal display device is not mounted to the apparatus, in the first mode, the beam divergence controller is to set a first subset of pixels at a first beam divergence and set a second subset of pixels at a second beam divergence different from the first beam divergence, the first subset of pixels at a center of the array of light sources and the second subset of pixels at least partially surrounding the first subset of pixels, and, in the second mode, the beam divergence controller is to set the light sources at a same beam divergence; and
a beam direction controller
to control beam directions of the of the light sources in the array.

16. The personal display device of claim 15, wherein the array of light sources further includes a plurality of resonant cavity light emitters, the beam divergence controller to control the beam divergence of the plurality of resonant cavity light emitters based on locations of respective ones of the resonant cavity light emitters.

17. The personal display device of claim 15, wherein the array of light sources further includes a plurality of light emitting elements associated with a plurality of micro-lenses, the beam divergence controller to control the beam divergence of the plurality of micro-lenses based on locations of respective ones of the plurality of micro-lenses.

18. The personal display device of claim 15, wherein the beam direction controller is to set the beam directions of the light sources in the array based on respective locations of the light sources in the array in response to the personal display device being coupled to the apparatus and set the beam directions of the light sources in the array to be aligned in response to the personal display device being uncoupled from the apparatus.

19. The personal display device of claim 15, wherein the beam direction controller includes a plurality of prisms, the beam direction controller to control the beam directions based on locations of respective ones of the plurality of prisms.

20. The personal display device of claim 15, wherein the beam direction controller includes a directional grating array to control the beam directions.

21. The personal display device of claim 15, wherein the beam direction controller includes a directional metasurface to control the beam directions.

22. A method of producing a personal display to be mounted to an apparatus, the method comprising:
operatively coupling an array of light sources with:
a beam divergence controller, the beam divergence controller to operate in a first mode when the personal display is mounted to the apparatus, the beam divergence controller to operate in a second mode when the personal display is not mounted to the apparatus, in the first mode, the beam divergence controller is to set a first subset of pixels at a first beam divergence and to set a second subset of pixels at a second beam divergence different from the first beam divergence, the first subset of pixels at a center of the array of light sources and substantially enclosed by the second subset of pixels, and in the second mode, the beam divergence controller is to set all of the light sources in the array at a third beam divergence; and
a beam direction controller operatively coupled to the array of light sources, the beam direction controller to control beam directions of the light sources in the array.

23. The method of claim 22, further comprising including:
providing a converging lens; and
positioning the array of light sources approximately at a focal point of the converging lens.

24. The method of claim 22, further including arranging the array of light sources along a curve that extends along one or more axes of the array.

25. The method of claim 22, wherein the array of light sources further includes a plurality of resonant cavity light emitters, the beam divergence controller to control the beam divergence of the plurality of resonant cavity light emitters based on locations of respective ones of the plurality of resonant cavity light emitters.

26. The method of claim 22, wherein the array of light sources further includes a plurality of light emitting elements associated with a plurality of micro-lenses, the beam divergence controller to control the beam divergence of the plurality of micro-lenses based on locations of respective ones of the plurality of micro-lenses.

27. The method of claim 22, wherein the beam direction controller further includes a plurality of prisms, the beam direction controller to control the beam directions based on locations of respective ones of the plurality of prisms.

28. The method of claim 22, wherein the beam direction controller further includes a directional grating array to control the beam directions.

29. The method of claim 22, wherein the beam direction controller further includes a directional metasurface to control the beam directions.

* * * * *